(12) United States Patent
Coyle

(10) Patent No.: US 7,781,040 B2
(45) Date of Patent: Aug. 24, 2010

(54) FLEXIBLE COMPOSITE TUBULAR ASSEMBLY WITH HIGH INSULATION PROPERTIES AND METHOD FOR MAKING SAME

(75) Inventor: William G. Coyle, Kingwood, TX (US)

(73) Assignee: DeepFlex Inc., Houston, TX (US)

( * ) Notice: Subject to any disclaimer, the term of this patent is extended or adjusted under 35 U.S.C. 154(b) by 825 days.

(21) Appl. No.: 11/723,693

(22) Filed: Mar. 21, 2007

(65) Prior Publication Data

US 2008/0233318 A1    Sep. 25, 2008

(51) Int. Cl.
*B29D 22/00* (2006.01)
*B29D 23/00* (2006.01)
*B32B 1/08* (2006.01)

(52) U.S. Cl. .................. 428/36.91; 428/36.9; 138/130; 138/129; 138/140; 242/440.1; 156/190; 156/191; 156/184; 156/195; 156/192

(58) Field of Classification Search .................. 138/130, 138/129, 140; 428/36.91, 36.9; 242/440.1; 156/190, 191, 184, 195, 192
See application file for complete search history.

(56) References Cited

U.S. PATENT DOCUMENTS

| 5,261,462 | A | 11/1993 | Wolfe et al. |
| 5,435,867 | A | 7/1995 | Wolfe et al. |
| 6,491,779 | B1 | 12/2002 | Bryant |
| 6,804,942 | B2 | 10/2004 | Bryant |
| 7,073,978 | B2 | 7/2006 | Bryant |

*Primary Examiner*—Michael C Miggins
(74) *Attorney, Agent, or Firm*—Osha • Liang LLP

(57) ABSTRACT

The present invention is directed to an improvement over the flexible composite tubing described in U.S. Pat. Nos. 6,491,779, 6,804,942, and 7,073,978, wherein said improvement provides for void space or otherwise insulating region along the length of the tubing. The present invention is additionally directed to methods for implementing such improvement.

20 Claims, 4 Drawing Sheets

FLEXIBLE COMPOSITE TUBULAR ASSEMBLY WITH HIGH INSULATION PROPERTIES AND METHOD FOR MAKING SAME

FIELD OF THE INVENTION

This invention relates generally to flexible composite tubing, and specifically to flexible composite tubing having high insulation properties.

BACKGROUND

Conventional bonded flexible pipe is described in American Petroleum Institute document API Specification 17J. These types of pipe are typically used for both "sweet" and "sour" service production, including export and injection services. Fluids transported include oil, gas, water and injection chemicals and gas. A typical construction is made up of a plurality of tubular layers, starting with an interlocking metal carcass and followed by a liner tube of plastic to retain the fluid within the pipe. Hoop strength armor reinforcement in the hoop direction is provided by helical metal wires which may be in several layers and wound in opposite helical directions. Additional layers may also be used, with a final jacket extrusion to complete the assembly, with a tough wear-resistant material.

1. Composite Pipe

U.S. Pat. Nos. 5,261,462 and 5,435,867, both issued to Donald H. Wolfe et al., are examples of tubular composite pipe in the prior art. Those patents relate to tubular structures having a plastic (i.e., polymeric) tube for the fluid conductor, which has an outer layer formed from alternating spirally wound strips of composite and elastomer. It is believed that the prior art composite pipes, such as disclosed in the above patents, have been limited to relatively short commercial lengths, by reason of the method by which such tubular structures have been made.

Typically, composite flexible pipes are made by filament winding, which involves turning the pipe while feeding and moving resin impregnated fibers from bobbins back and forth along the length of the pipe. Such technique limits the length of the reinforced flexible pipe which can be manufactured because of the number of bobbins required for the large number of fibers that are used in each pass. As a practical matter, it was not known how to make relatively long lengths of composite pipe sufficient for subsea use because of such problem.

In single bobbin machines, unloading and reloading time is a function of the time taken to thread each end of the fibers, the number of bobbins, and the time required to replace each bobbin. Also, due to the material payload requirements, a single bobbin-type machine will require each end to travel some distance from its bobbin over rollers, sheaves, eyelets, etc., through the machine to the closing point on the pipe, thus creating a time-consuming task. Because of the hundreds, and even thousands of bobbins, extremely large machines would be required to make a composite-reinforced pipe in long lengths using such prior art techniques. Consequently, the industry has not had available composite flexible pipes in long lengths suitable for subsea production and well operations. Multiple fiber tows are also not practical for long pipe lengths because of the fiber loading times required.

2. Long Flexible Composite Pipe

As described in U.S. Pat. Nos. 6,491,779, 6,804,942, and 7,073,978, all issued to Michael J. Bryant, discrete tapes are first formed from fibers and resin or the like, so that the tapes are wound on spools, which reduces the number of bobbins required as compared to the number of bobbins required for single fiber filaments, whereby it is possible to manufacture long lengths of composite flexible pipe. The tapes are initially formed and then are fed from tape spools rather than the fiber bobbins in the prior art. Also, each tape is composed of a plurality of superimposed thin tape strips formed of predominantly, unidirectional fibers, which are impregnated with an epoxy or other suitable bonding resin which cures with heat, cold, ultraviolet (UV) or other curing methods. The multilayer tapes are wrapped with a polyethylene or similar plastic or thin metallic strip or covered by thermoplastic extrusion to confine them as a unit together, with bonding adhesive between the tape strips being prevented from escaping from the wrap. Each tape thus made is fed from a tape spool to the tubular core as the tubular core is rotated, or as the spools are rotated relative to the core, which produces helical wraps of each of the tapes on the tubular core in the same or opposite helical directions for reinforcement of the core.

FIGS. 1-5 illustrate prior art flexible composite tubing that forms a basis for the improvement provided by the present invention. Consequently, elements identified in FIGS. 1-5 correspondingly have reference relevance in FIGS. 6 and 7 illustrating embodiments of the present invention.

Referring now to FIG. 1, a preassembled fiber tape strip is shown which is formed of a plurality of fibers 11 which extend parallel to each other in the warp direction which is the main direction of the tape. Those fibers are made of fiber glass, Kevlar, carbon or similar materials. Fibers 12 are disposed perpendicular to the fibers 11 and extend underneath them and typically are joined together with a stitch in the manufacturing and assembly process. Such fibers 12 are in the weft direction across the tape strip. Preferably, the majority strength of the tape strip is provided in the direction of the fibers 11, and in some instances each strip of tape may be formed solely of warp fibers 11. Also, strips of thin metal of steel, aluminum, or other metal, some being perforated, may be used between or outside of the fiber strips in each laminate 15.

The fiber matrix formed of the fibers 11 and 12 may be separately formed and thereafter impregnated with a resin such as an epoxy resin, or the fiber matrix may be made on the same machine that impregnates such fibers with the resin.

FIG. 2 is an illustration of the tape strip T of the prior art invention (and by extension this invention), one form of which is made by impregnating the fibers 11 and with an epoxy resin or the like to form a single laminate 15. The laminates need to be as thin as possible to reduce strain in them when they are bent onto a pipe surface. Typically, the thickness of each laminate layer is from about 0.010" to about 0.030". This is somewhat of a trade-off between (a) very thin tape which provides for very efficient but long production process, and (b) a thicker tape which is less efficient (more strain) but requires less production time.

Each laminate 15 which is formed by the prior art and this invention is a separate tape T. A plurality of such tapes T are superimposed on each other as shown in FIG. 3 and, as will be explained, are bonded together by an adhesive which may initially be an uncured epoxy or resin between the tapes T which is later cured during or after the tapes A are wrapped on the core C. Once the adhesive between the tapes cures, the overall laminate product A assumes the radius to which it was bent. This happens because the tapes 15 slide over each other, and then when the adhesive cures, they cannot slide.

In FIG. 3, the finished tape A is shown in cross-section schematically with the warp fibers 11 exposed at the ends, and the epoxy impregnating and bonding the multiple tapes into the final tape T. The weft fibers are not shown in FIG. 3 because they extend across FIG. 3 just behind the cut line for FIG. 3.

An external protective jacket 20 of nylon, polyethylene, or similar flexible thermoplastic or elastomeric material surrounds the superimposed tapes T and encloses the adhesive between such tapes T so that none of the uncured adhesive escapes from the jacket 20 during curing.

A typical arrangement for forming the final tape A shown in FIG. 3 is illustrated by the equipment schematically shown in FIG. 4.

By way of example, the laminates 15 or tapes T are arranged in a superimposed relationship and are fed through squeeze rollers 25. Prior to reaching the squeeze rollers 25, the tapes T are spaced apart so that adhesive in the form of a resin or the like is applied between the tapes T with any suitable type of applicator 27 or spray which supplies adhesive or resin from an injector 28 and header 29 suitably connected to the applicator 27.

Guide rollers 35 serve to maintain the tapes T in a superimposed alignment with each other.

Finally, a rotatable spool 37 which has a wrapping sheet 39 of polyethylene, nylon or similar flexible thermoplastic or elastomeric material thereon is positioned for feeding a helical wrap of the sheet 39 to form a protective jacket 20 by rotating the spool head 37. Such protective jacket 20 is thus formed by the sheet 39 being wrapped about the tapes T to form the final multitape product A shown in cross-section in FIG. 3. Instead of the helical wraps of sheet 39, a "cigarette" wrap may be formed by a longitudinal sheet that extends lengthwise of the tape T, and which is folded to partially or fully extend around or substantially around the tape T. The helical sheet 39 preferably may then be wrapped outside of the cigarette wrap to complete product A.

Referring now to FIG. 5, a simple pipe construction is illustrated for showing the use of the tape A for reinforcing an inner core or tube C which is formed of a flexible fluid conducting material such as flexible polyethylene or metal which is thick enough to have some rigidity but thin enough to still be flexible without significant deformation or collapse. An anti-abrasive (flexible sheet or membrane) layer B of relatively thin polyethylene or the like is preferably disposed between the helical wraps of the tapes A to provide for anti-abrasion between two layers of the helical wraps. Although the wraps of the tapes A are shown as opposite helical wraps, the invention is not limited thereto. For example, the construction may have two or more wraps with a left hand lay, and two or more with a right hand lay, and then two or more with a left hand lay.

It is noted that the tapes A are in a non-bonding relationship to the core or tube C and to each other so that when the core or tube C flexes during use, the tapes A may slide to a limited extent relative to the core or tube C and to each other to permit the flexing of the entire assembly. Additionally, it is noted that there are small gaps or helical spaces 40 between each of the tapes A to provide for limited relative movement of the tapes A with respect to the core or tube C and to each other for flexibility when the core or tube C is flexed.

3. Insulating Tubing

Producing oil and gas in deep water or in extreme climates can make insulating pipe important in flow assurance. The common method of using steel pipe in such insulating pipe designs creates very heavy, expensive and difficult to install pipe that requires significant engineering and equipment to manufacture and install. None of the flexible composite tubing described above is inherently insulating in character.

Notwithstanding the above-described advances in flexible tubing provided by the inventions described in U.S. Pat. Nos. 6,491,779, 6,804,942, and 7,073,978, a method for insulating such tubing, while at the same time retaining its lightweight characteristics, would be very beneficial.

BRIEF DESCRIPTION OF THE INVENTION

The present invention is generally directed to an improvement over the flexible composite tubing described in section 2 of the background and in U.S. Pat. Nos. 6,491,779, 6,804,942, and 7,073,978; wherein said improvement includes void space or otherwise insulating region along the length of the tubing. The present invention is additionally directed to methods for implementing such improvement and providing for a corresponding insulating flexible composite tubular assembly (tubing).

In some embodiments, the present invention is directed to an insulating composite tubular assembly, comprising: (a) a tubular core of fluid-conducting flexible material having an external curved surface; (b) a plurality of superimposed substantially coextensive strips or tapes of material, which are thin and flexible enough to bend to substantially conform to (i.e., be wound about) the curved external surface of said core; (c) at least one flexible sheet(s) substantially around said strips to confine said strips together in the superimposed relation; and (d) at least one void-generating layer, the void-generating layer comprising: i) at least one void-generating structural element disposed about the at least one flexible sheets; and ii) an insulating layer disposed about the at least one void-generating structural elements such that one or more insulating voids are established between the at least one flexible sheet and the insulating layer.

In some embodiments, the present invention is directed to a method of forming an insulating composite tubular assembly, the method comprising the steps of: (a) superimposing a first set of a plurality of thin flexible strips of material substantially coextensively with each other; (b) superimposing a second set of a plurality of thin flexible strips of material substantially coextensively with each other; (c) wrapping said first set and said second set at opposite helical angles on a fluid conducting tube of flexible material (tubular core) without bonding either of said sets to each other or to said tube so as to provide limited sliding relative movement of said strips relative to each other and to said tube; (d) disposing at least one void-generating structural element about the set of thin flexible strips with a flexible sheet interposed therebetween; and (e) disposing an insulating layer about the at least one void-generating structural element such that one or more insulating voids are established between the flexible sheet and the insulating layer. It is envisioned that either a single set or more than two sets of a plurality of thin flexible strips could be used, and that such wrapping of multiple sets could be done at only marginally helical angles.

Numerous variations exist with regard to the above-described tubular assembly and method embodiments, particularly with respect to dimensions, materials, etc. Furthermore, the tubular assemblies can further comprise one or more additional layers to enhance the performance and/or increase the operational parameters of the tubing. Materials, dimensions, and additional layer(s) can be adjusted/added to suit a particular application and/or environment.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

As mentioned in the brief description above, the present invention is generally directed to an improvement over the flexible composite tubing described in U.S. Pat. Nos. 6,491,779, 6,804,942, and 7,073,978, wherein said improvement provides for void space or otherwise insulating region along the length of the tubing, thereby providing for an insulated flexible composite tubing assembly. The present invention is additionally directed to methods for implementing such improvement. What follows is a more detailed discussion of such insulated flexible composite tubing and methods for making same.

1. Definitions

Most of the terms used herein are used in accordance with their usage as typically applied in the art. Nevertheless, the following terms are more definitively defined below.

"Tubing," as defined herein, refers to flexible pipe. Such tubing generally comprises multiple layers and is typically a "tubular assembly" of such layers. Accordingly, such terms will be used synonymously herein.

Figure 1:
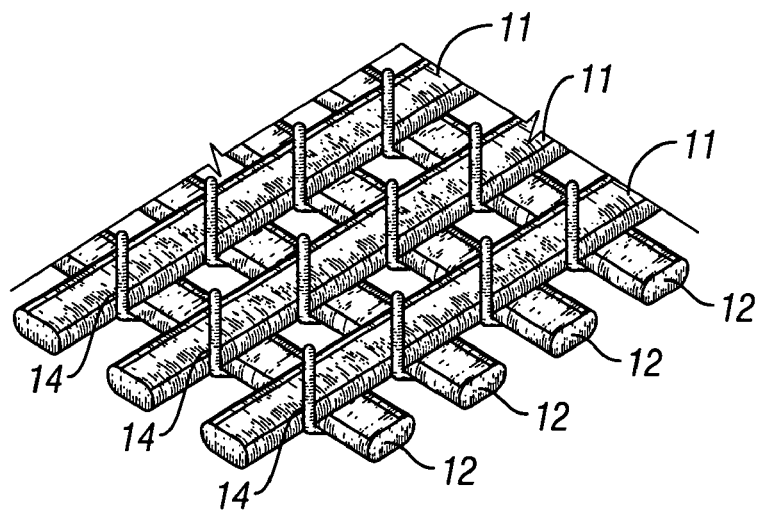
FIG. 1 is an isometric view of a typical fiber arrangement for the tape of a prior art invention and used in accordance with some embodiments of the present invention.
Figure 2:
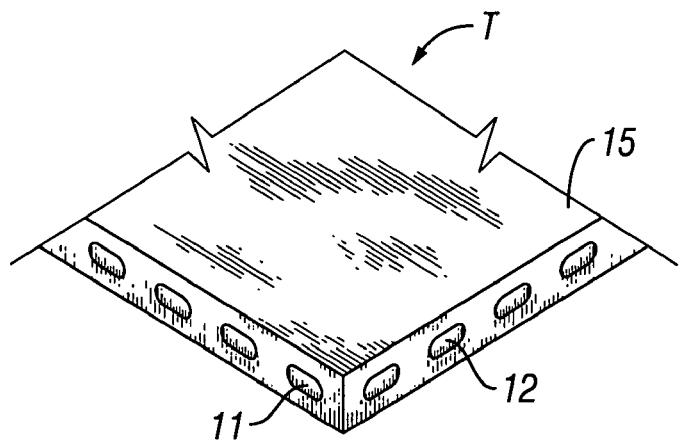
FIG. 2 is a view of the fibers of FIG. 1 embedded in a resin such as an epoxy resin.
Figure 3:
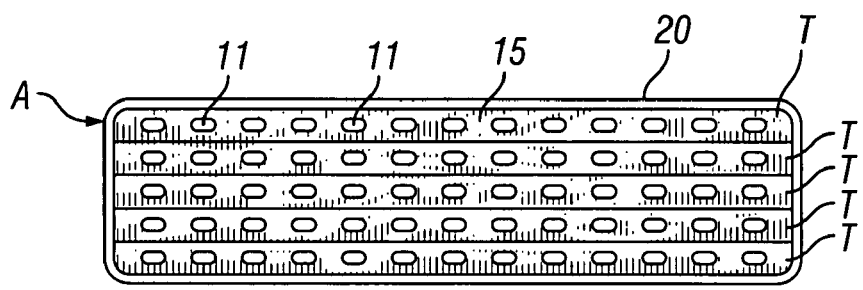
FIG. 3 is a cross sectional view of the final tape which has a plurality of fiber tapes laminated together with a thermoplastic or elastomeric material to form a composite tape as a unit.
Figure 4:
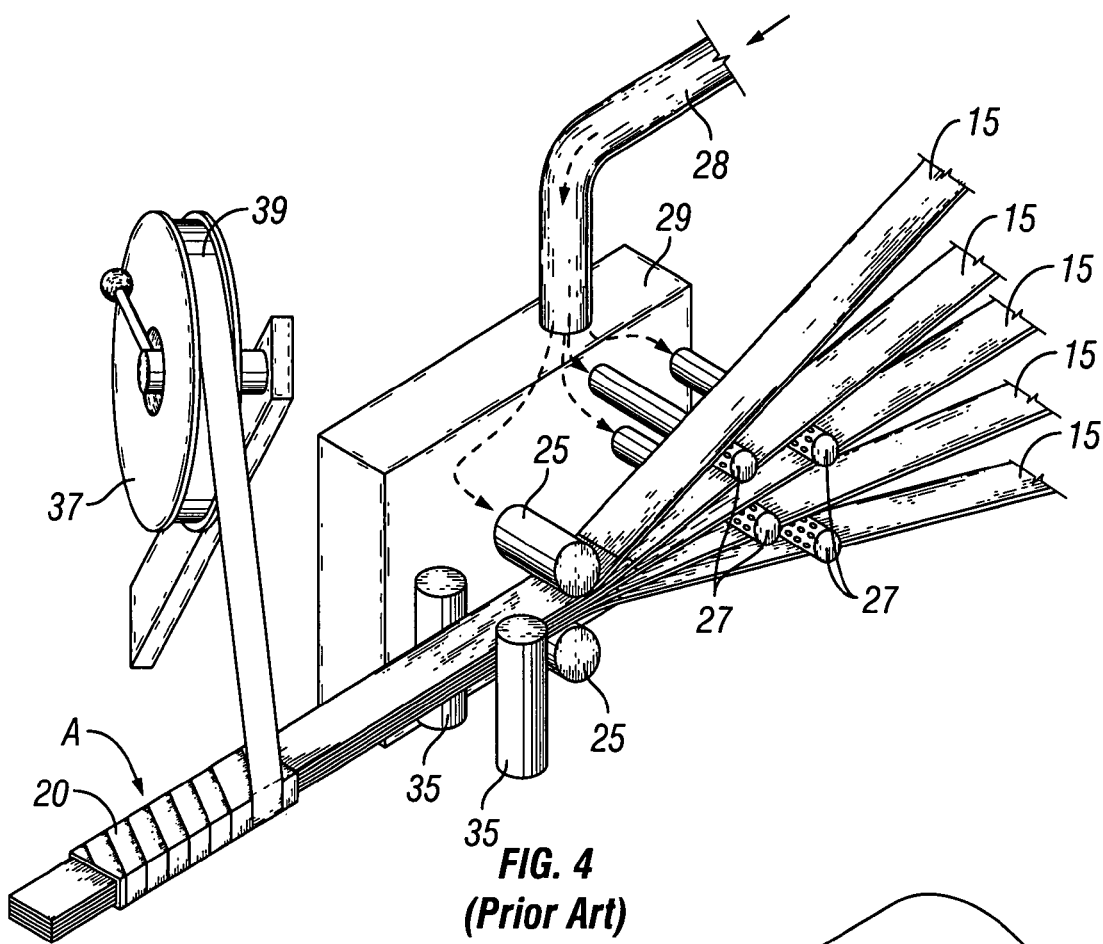
FIG. 4 is a schematic illustration of a method of a prior art invention showing the method and apparatus for making the resin impregnated fiber tapes of this invention.

"Composite," as described herein, refers to a tubular assembly comprising at least one composite element or layer. For example, the section of tape T depicted in FIG. 2 is a composite of fibers 11 and 12 and a matrix material 15.

"Flexible," as defined herein, refers to tubing that is pliable and which can be deformed or bent in a non-destructive or non-permanent manner.

"Insulating," as defined herein, refers to a tubing characteristic comprising partial or complete thermal isolation of fluid within said tubing from the environment surrounding said tubing.

2. Highly-Insulating Flexible Composite Tubing

Figure 6:
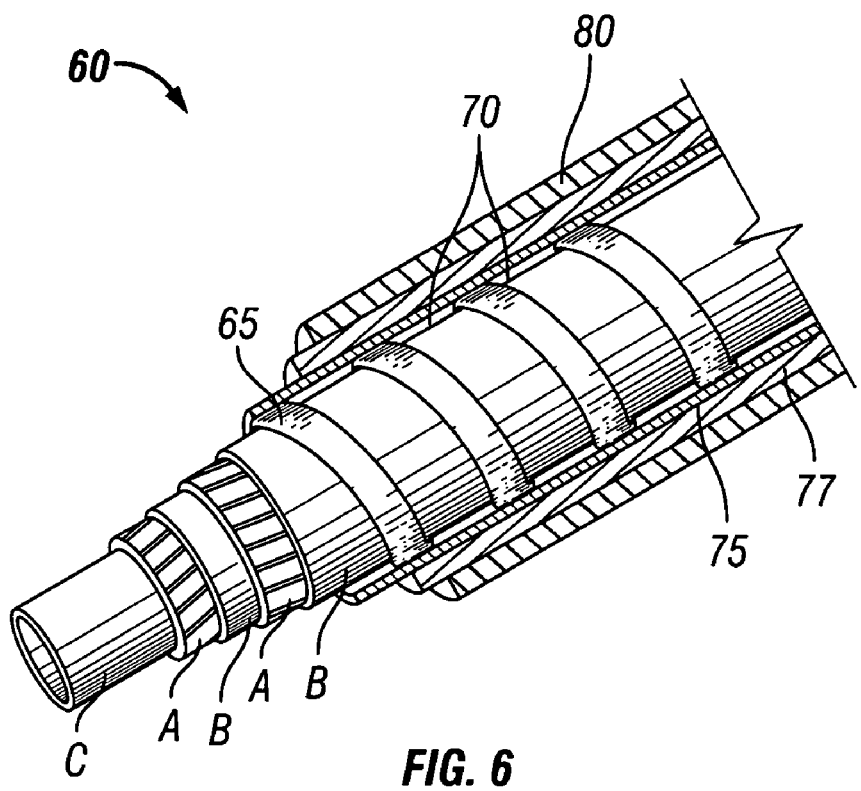
FIG. 6 is an isometric (and partially cutaway) view of tubing made with an improved insulating feature, in accordance with some embodiments of the present invention.
Figure 7:
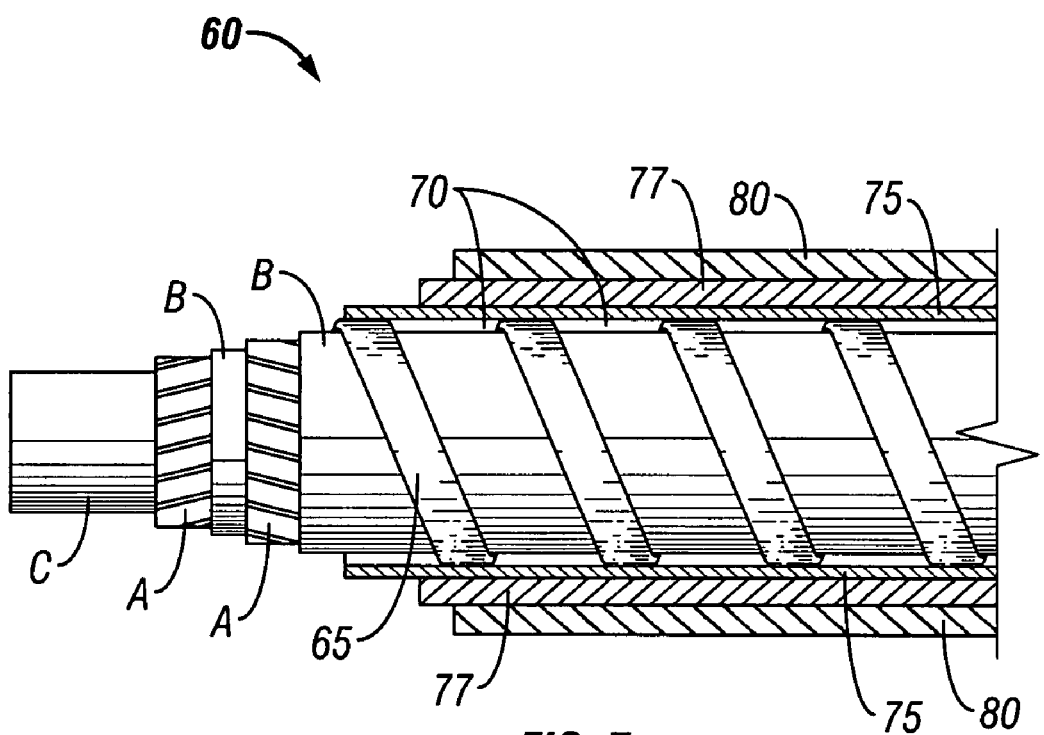
FIG. 7 is a partially-cutaway side view of the tubing depicted in FIG. 6.

Referring to FIGS. 6 and 7, in some embodiments, the present invention is directed to an insulating composite tubular assembly 60, comprising: a tubular core C of fluid conducting flexible material having an external curved surface; a plurality of superimposed substantially coextensive strips (e.g., tapes) of material (A), which are thin and flexible enough to bend to substantially conform to the curved external surface of said core; at least one flexible sheet B substantially around said strips A to confine said strips together in the superimposed relation; and at least one void-generating layer, the void-generating layer comprising: i) at least one void-generating structural element 65 disposed about the at least one flexible sheet B; and ii) an insulating layer 75 disposed about the at least one void-generating structural elements such that one or more insulating voids are established between the at least one flexible sheet and the insulating layer.

Still referring to FIGS. 6 and 7, in some such above-described embodiments there further comprises a hoop reinforcement or crush layer 77. In these or other embodiments, there further comprises a membrane extrusion layer 80. Additional layer(s) of membranes and/or tensile strength reinforcement between the insulating layer 75 and the membrane extrusion layer 80 are also found in some embodiments.

With regard to the above-described tubular core C, such a core or liner extrusion is typically as described in the background section. However, such core or liner can typically have an external diameter from about 2 inches to about 48 inches and an internal diameter from about 1.75 inches to about 46 inches. Suitable materials of which the core can be comprised include, but are not limited to, high-density polyethylene (HDPE), polyamide 11 (PA-11), polyvinylidine fluoride (PVDF), crosslinked polyethylene (XLPE), and the like.

Figure 5:
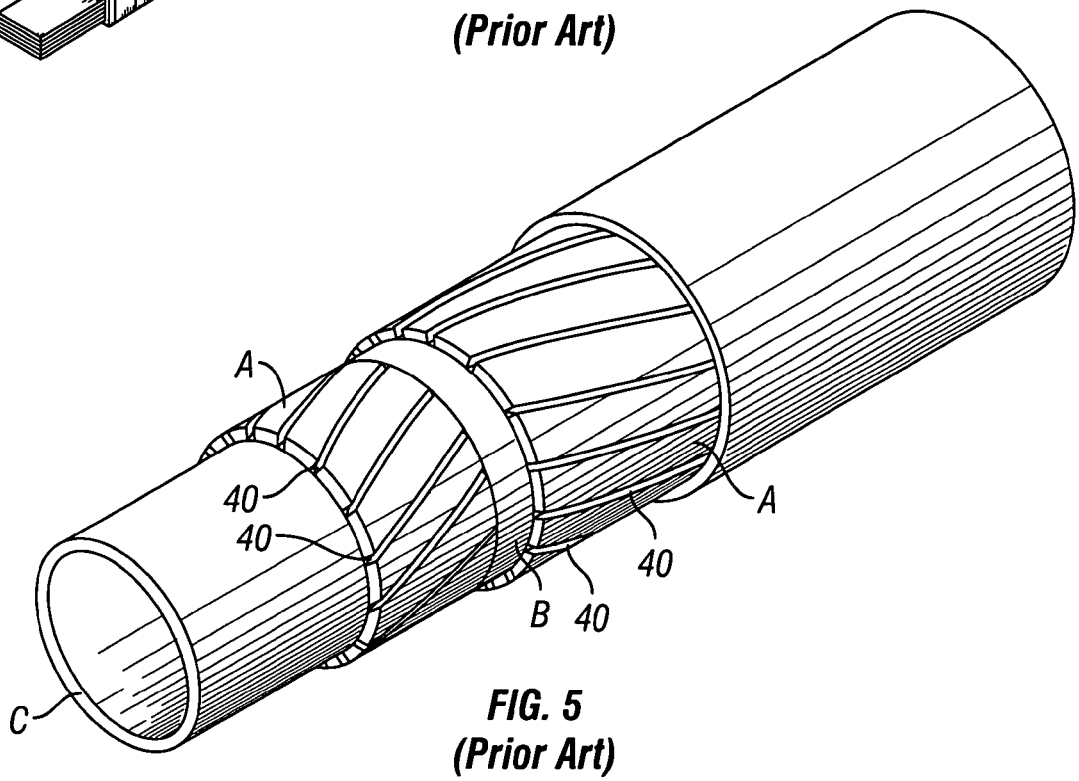
FIG. 5 is an isometric view of a pipe made in accordance with a prior art invention, showing the arrangement of the tapes helically wound on the fluid conducting core or tube.

With regard to the above-described plurality of superimposed substantially coextensive strips of material A, these strips are typically in the form of the tapes described in the background section. Such tapes or strips typically comprise a plurality of sub-tapes T, and are typically wound about the tubular core C in a helical fashion (i.e., at an angle). Where there are multiples such layers of A, the direction of the helicity of the wrapping is typically alternated between successive layers such that they are wound at opposing angles. Typically there is a flexible sheet B wrapped around each sheet, e.g., as depicted in FIG. 5.

With regard to the above-described at least one flexible sheet B, such a sheet is typically as described in the background section, wherein it serves to secure each tape layer. Typically, the tubular assembly will comprise one such flexible sheet B for each tape layer A wrapped about the tubular core C.

With regard to the above-described void-generating layer (s), such layers generally comprise at least one void generating element 65. In some embodiments, such a void-generating layer is provided by a single, continuous void-generating element 65 helically-wrapped about the axis of the tubular assembly. An insulating layer 75, in contact with the void-generating element 65, creates a continuous helical void 70 about the tubular assembly. In some embodiments, multiple such void-generating layers exist about the tubular assembly, typically separated by a membrane extrusion layer 80.

With regard to the above-described void-generating structural element 65, in some embodiments this is a single strip of material helically wrapped about the tubular assembly so as to provide structural elevations along the tube length that, when contacted with the insulating layer 75, form void 70. In some embodiments, the angle (relative to the tube axis) at which such a structural element 65 is wound can be in the range from about 0 degrees to about 90 degrees, typically in the range from about 45 degrees to about 90 degrees, and more typically in the range from about 50 degrees to about 85 degrees. While not being particularly limited, such void-generating structural element(s) can generally be comprised of any material that can maintain the void space in the tubular assembly 60. Exemplary such materials include, but are not limited to composites, polymeric material, fiberglass, and the like. In terms of the structural element's 65 thickness and height, both are generally in the range of from about 0.25 inches to about 3.0 inches. The void-generating structural element 65 need not be substantially uniform along the length of the tubular assembly, but this is often the case. Typically, materials of which this element is comprised are consistent with the desire to provide flexible, insulating, and lightweight tubing.

With regard to the above-described insulating layer 75, the material and thickness of which the insulating layer 75 is comprised is not particularly limited, save that it does not completely conform to the structural irregularity provided by the void-generating structural element(s) 65, otherwise no voids would be created.

With regard to the above-described void(s) 70, the nature of such voids are largely dependent upon the combined nature of the void-generating structural elements 65 and the insulating layer 75 that collectively form such voids. Such void(s) can be continuous along the length of the tubular assembly, or they may be discrete regions along the length of the assembly. Most generally, the void volume per unit length of tubular assembly is sufficient to provide insulation enhancement to the tubular assembly. In some embodiments, a void volume per foot of tubular assembly typically ranges from about 300 cubic inches to about 1500 cubic inches, but can range from about 40 cubic inches to about 5000 cubic inches per foot of pipe depending on the internal and external diameters of the pipe required for a specific application. Such void(s) can be filled with inert or other gas, insulating filler (e.g., foam), or they may be evacuated to provide for vacuum insulation.

With regard to the above-described hoop reinforcement or crush layer 77, such hoop reinforcement typically comprises one or more thick, helically-wound rectangular section wraps of composite material (not unlike tapes A). This reinforcement layer is typically wound at an angle to withstand both radial and longitudinal compressive loads generated by hydraulic or other specified pressure on the membrane extrusion layer 80 (vide infra).

With regard to the above-described membrane extrusion layer 80, in some embodiments, this layer is typically a thermoplastic extrusion designed to seal against the compressive loads generated by external seawater pressure. Not only can this layer act as a barrier to external water pressure, but it also can provide a slip surface for reinforcements.

Additional layers to the tubular assembly can include one or more tensile reinforcement layers typically comprising two contra-helically wound rectangular section wraps of composite material laid out at angles suitable for carrying tensile loads other than those generated by internal pressure. Such layers can typically also include an external jacket, said external jacket typically comprising a thermoplastic extrusion designed to provide for the tubular assembly, a degree of protection from incidental damage. Such an external jacket can also serve as the surface used for monitoring twist and identifying the pipe. A typically marking is a repeating legend in the form of a printed contrasting color "lay-line."

As mentioned in the background section, and as depicted in FIG. 5, gaps 40 are present between tapes A of a given layer. Such gaps 40, however, are insufficient in size so as to provide insulation. Further, as their presence is to provide flexibility, such gaps can close in regions of the tubing that are bent. Insulating voids 70 of the present invention are sufficient in size to provide insulation enhancement, do not close when the tubing is bent or otherwise deformed, and they can be filled with insulating material such that the flexible nature of the tubing is not adversely affected.

Overall, the length of the insulating composite tubular assembly 60 is not particularly limited. Understandably, the length is often dictated by nature of its intended use—as are its other dimensions and the materials and layers of which it is comprised. Typically, however, the insulating composite tubular assembly 60 has an outside diameter (OD) in the range of from about 4 inches to about 68 inches.

A variation (i.e., alternate embodiment) on the above-described insulating composite tubular assembly is having a plurality of void-generating structural elements positioned as rings about the tubular assembly (as opposed to a continuous helical coil). Accordingly, a plurality of corresponding voids are generated by contact of the insulating layer with the plurality of such ring-like void-generating structural elements.

3. Methods

Figure 8:
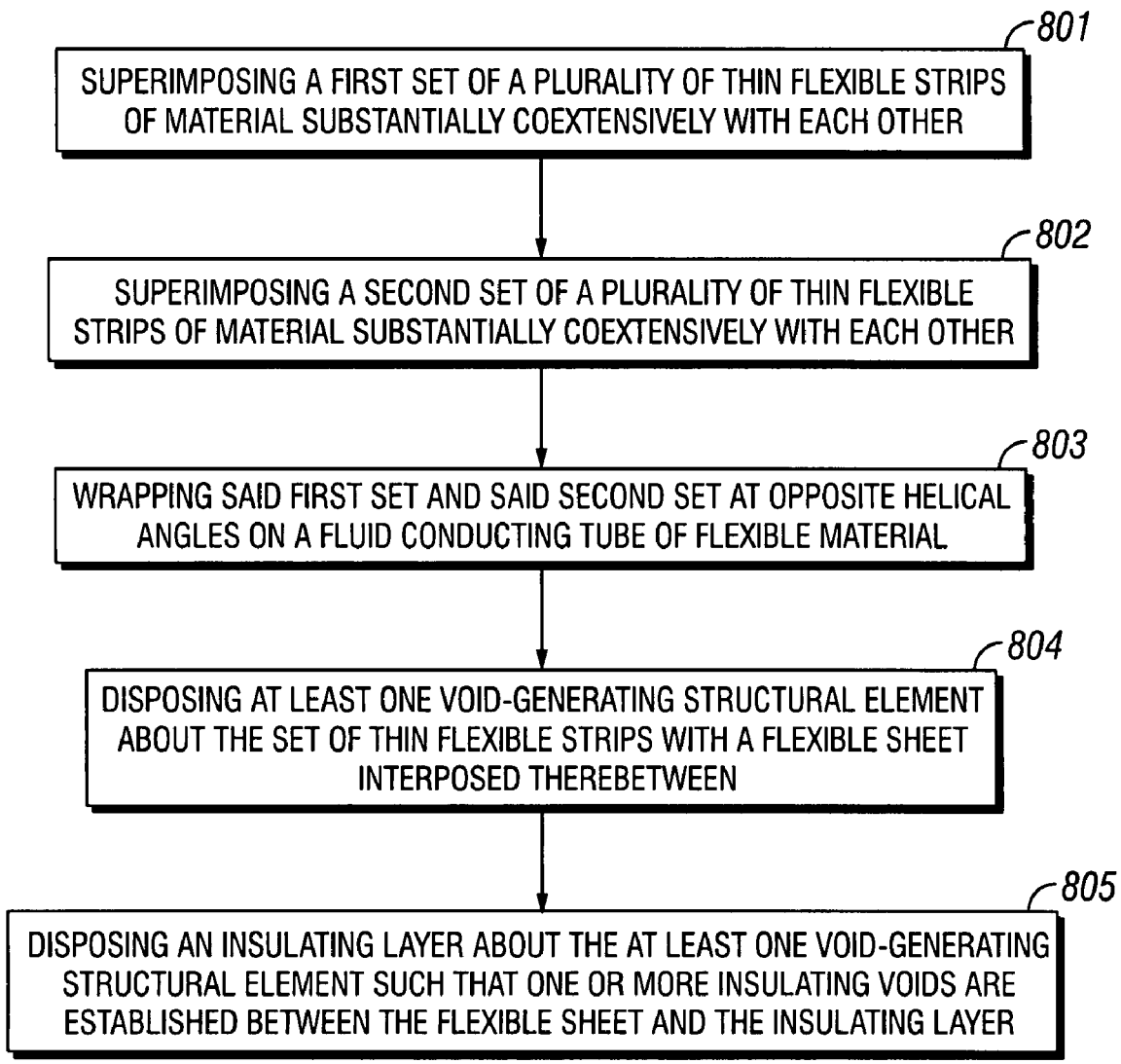
FIG. 8 depicts, in stepwise fashion, a method of forming an insulating composite tubular assembly, in accordance with some embodiments of the present invention.

Referring to FIG. 8, in some embodiments, the present invention is directed to a method of forming a composite tubular assembly, the method comprising the steps of: (Step 801) superimposing a first set of a plurality of thin flexible strips (e.g., tapes) of material substantially coextensively with each other; (Step 802) superimposing a second set of a plurality of thin flexible strips of material substantially coextensively with each other; (Step 803) wrapping said first set and said second set at opposite helical angles on a fluid conducting tube (tubular assembly core) of flexible material without bonding either of said sets to each other or to said tube so as to provide limited sliding relative movement of said strips relative to each other and to said tube; (Step 804) disposing at least one void-generating structural element about the set of thin flexible strips with a flexible sheet interposed therebetween; and (Step 805) disposing an insulating layer about the at least one void-generating structural element such that one or more insulating voids are established between the flexible sheet and the insulating layer.

In some embodiments, only a single set of a plurality of the thin flexible strips is wrapped about the fluid-conducting tubular core of the assembly. In some embodiments, such above-described methods further comprise one or more additional steps that dispose one or more additional layers about the insulating layer. Typically, such methods provide for the continuous production of such insulating composite tubing, such methods further capable of providing for such tubing in extremely long lengths suitable for, e.g., deep sea oil and gas transport. Such methods generally provide for the insulating composite tubular assembly described in the previous section.

A variation on the above-described process, being consistent with the tubular assembly variation described in the previous section, involves the placement of a plurality of ring-like void-generating structural elements about the tubular assembly so as to create a single layer of discrete voids upon application of an insulating layer about the ring-like void-generating structural elements.

4. Summary

The foregoing discussion has detailed a flexible composite tubular assembly having improved performance as a result of enhanced insulation properties—provided for by insulation void(s) being incorporated into the assembly. Such an improvement extends the usefulness of such tubing and provides for fluid transport in environments/systems previously incompatible with lightweight flexible composite tubing. The present invention, while being directed to such insulated flexible composite tubing (in the form of a tubular array), is also directed to methods of fabricating such improved tubing. At its most elemental level, the present invention is directed to a flexible tubing assembly comprising (a) a flexible core, and (b) and insulating layer; both of which having been described above. Any or all of the various other layers described above can either be eliminated and/or combined or integrated with such "elemental" and/or other layers as mentioned above.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed:

1. An insulating composite tubular assembly comprising:
   a) a tubular core of fluid conducting flexible material having an external curved surface;
   b) a first set of a plurality of superimposed substantially coextensive strips of material, which first set is thin and flexible enough to bend to substantially conform to the curved external surface of said core;
   c) a flexible first sheet substantially around said strips to confine said strips together in a superimposed relation;
   d) a second set of a plurality of superimposed substantially coextensive strips of material, which second set is thin and flexible enough to bend to substantially conform to the curved external surface of said core;
   e) a second flexible sheet separate from said first sheet substantially around said second set of strips to confine said strips in said second set together in a superimposed relation, which said second sheet is in at least partially non-bonding contact with said first sheet to provide limited sliding relative movement therebetween upon the flexing of said tubular core; and
   f) at least one void-generating layer comprising:
      i) at least one void-generating structural element disposed about the second flexible sheet; and
      ii) an insulating layer disposed about the at least one void-generating structural element such that one or more insulating voids are established between the second flexible sheet and the insulating layer.

2. The insulating composite tubular assembly of claim 1, wherein the insulating void is filled with an insulating material.

3. The insulating composite tubular assembly of claim 1, wherein the insulating voids account for a void volume per length of tubular assembly that ranges from about 40 cubic inches per foot of pipe to about 5000 cubic inches per foot of pipe.

4. The insulating composite tubular assembly of claim 1, wherein the at least one void-generating structural element is a coiled structure that elevates the insulating layer above the second flexible sheet, and wherein the insulating void is continuous in nature forming a continuous insulating void.

5. The insulating composite tubular assembly of claim 4, wherein the continuous insulating void is helically positioned about the tubular assembly.

6. The insulating composite tubular assembly of claim 1, further comprising a hoop reinforcement layer in contact with the insulating layer.

7. The insulating composite tubular assembly of claim 6, further comprising a membrane layer positioned about the hoop reinforcement layer.

8. The insulating composite tubular assembly of claim 7, further comprising one or more tensile reinforcement layers positioned around the membrane layer.

9. The insulating composite tubular assembly of claim 8, further comprising an external jacket layer positioned around the one or more tensile reinforcement layers.

10. A composite tubular assembly comprising:
    a) a tubular core of fluid conducting flexible material having an external curved surface;
    b) at least one set of a plurality of superimposed substantially coextensive strips of material, wherein said set is thin and flexible enough to bend to substantially conform to the curved external surface of said core;
    c) at least one flexible sheet substantially around each set of said strips to confine said strips together in a superimposed relation, wherein said sheet is in non-bonding contact with said core to provide limited relative sliding movement therebetween upon the flexing of said core; and
    d) at least one void-generating layer comprising:
       i) at least one void-generating structural element disposed about the at least one flexible sheet; and
       ii) an insulating layer disposed about the at least one void-generating structural elements such that one or more insulating voids are established between the at least one flexible sheet and the insulating layer.

11. The insulating composite tubular assembly of claim 10, wherein the insulating void is filled with an insulating material.

12. The insulating composite tubular assembly of claim 10, wherein the insulating voids account for a void volume per length of tubular assembly that ranges from about 40 cubic inches per foot of pipe to about 5000 cubic inches per foot of pipe.

13. The insulating composite tubular assembly of claim 10, wherein the at least one void-generating structural element is a coiled structure that elevates the insulating layer above the at least one flexible sheet, and wherein the insulating void is continuous in nature forming a continuous insulating void.

14. The insulating composite tubular assembly of claim 13, wherein the continuous insulating void is helically positioned about the tubular core.

15. The insulating composite tubular assembly of claim 10, further comprising a hoop reinforcement layer in contact with the insulating layer.

16. The insulating composite tubular assembly of claim 15, further comprising a membrane layer positioned about the hoop reinforcement layer.

17. The insulating composite tubular assembly of claim 16, further comprising one or more tensile reinforcement layers positioned around the membrane layer.

18. The insulating composite tubular assembly of claim 17, further comprising an external jacket layer positioned around the one or more tensile reinforcement layers.

19. A method of forming an insulated composite tubular assembly, said method comprising the steps of:

(a) superimposing a first set of a plurality of thin flexible strips of material substantially coextensively with each other;

(b) superimposing a second set of a plurality of thin flexible strips of material substantially coextensively with each other;

(c) wrapping said first set and said second set at opposite helical angles on a fluid conducting tube of flexible material without bonding either of said sets to each other or to said tube so as to provide limited sliding relative movement of said strips relative to each other and to said tube;

(d) disposing at least one void-generating structural element about the set of thin flexible strips with a flexible sheet interposed therebetween; and (e) disposing an insulating layer about the at least one void-generating structural element such that one or more insulating voids are established between the flexible sheet and the insulating layer.

20. The method of claim 19, wherein the method of forming said insulated composite tubular assembly involves a continuous and simultaneous implementation of the steps of which said method is comprised.

* * * * *